(12) United States Patent
Falkenberg et al.

(10) Patent No.: US 6,240,234 B1
(45) Date of Patent: May 29, 2001

(54) MECHANISM FOR SECURING CABLES

(75) Inventors: Dean R. Falkenberg, Windsor; Edward T. Iwamiya, Petaluma, both of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/452,763

(22) Filed: Dec. 1, 1999

(51) Int. Cl.[7] .................................................. G02B 6/00
(52) U.S. Cl. ............................ 385/136; 385/137; 174/48
(58) Field of Search ................................. 385/134, 136, 385/137, 135; 174/48

(56) References Cited

U.S. PATENT DOCUMENTS

| | | | | |
|---|---|---|---|---|
| 4,004,721 | * | 1/1977 | Ross ........................................ | 223/89 |
| 4,225,214 | * | 9/1980 | Hodge et al. .......................... | 385/136 |
| 5,039,147 | * | 8/1991 | Moon et al. ........................... | 292/338 |
| 5,102,173 | * | 4/1992 | Schallern .............................. | 292/288 |

* cited by examiner

Primary Examiner—Cassandra Spyrou
Assistant Examiner—Euncha Cherry
(74) Attorney, Agent, or Firm—Skjerven Morrill MacPherson LLP; Theodore P. Lopez

(57) ABSTRACT

A mechanism on which cables, wires, and leads may be secured. The mechanism includes a bar assembly, which has a hollow member in telescopic engagement with an insertable member. Preferably, the insertable member slides in and out of the hollow member, so that a dimension of the bar can be varied. The bar assembly of the present invention also includes telescopically engaged end members, one at each end of the mechanism. A length of the end members can be varied, such that the depth of the mechanism may be varied.

12 Claims, 3 Drawing Sheets

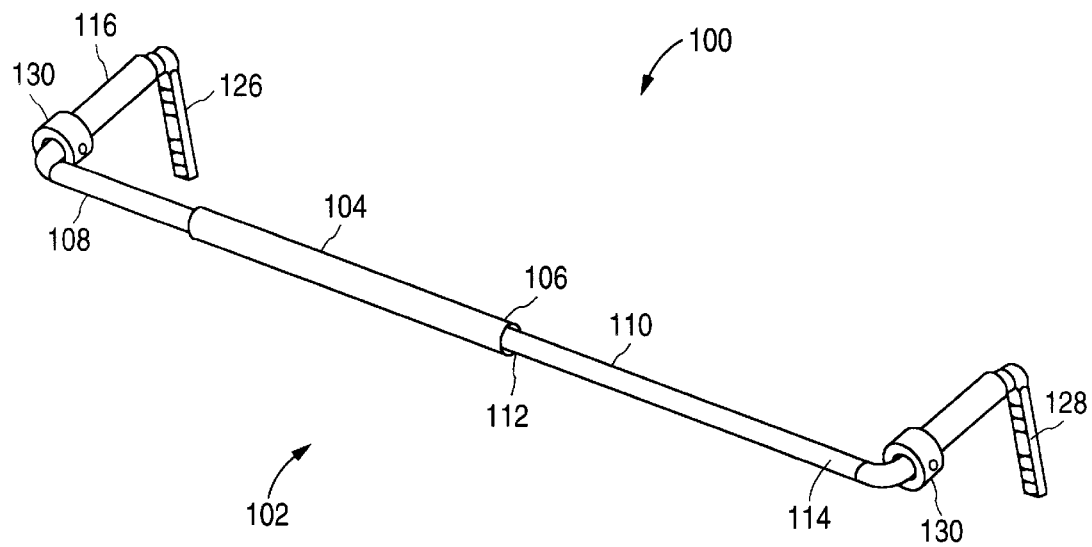
Fig. 1
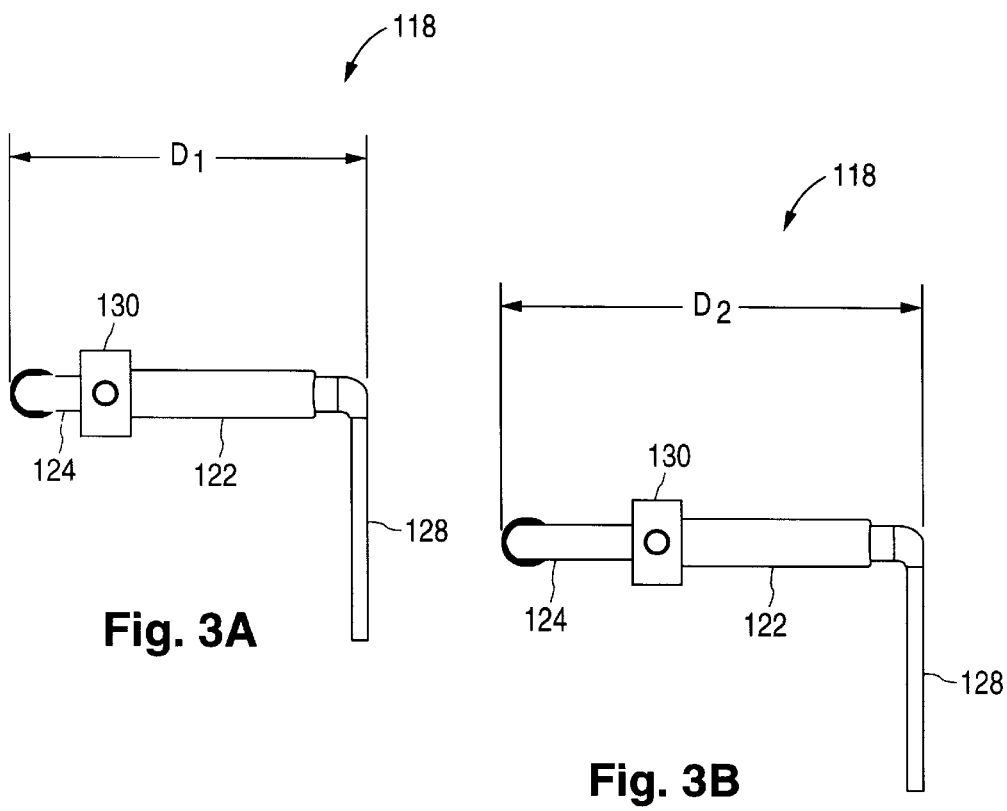
Fig. 3A
Fig. 3B

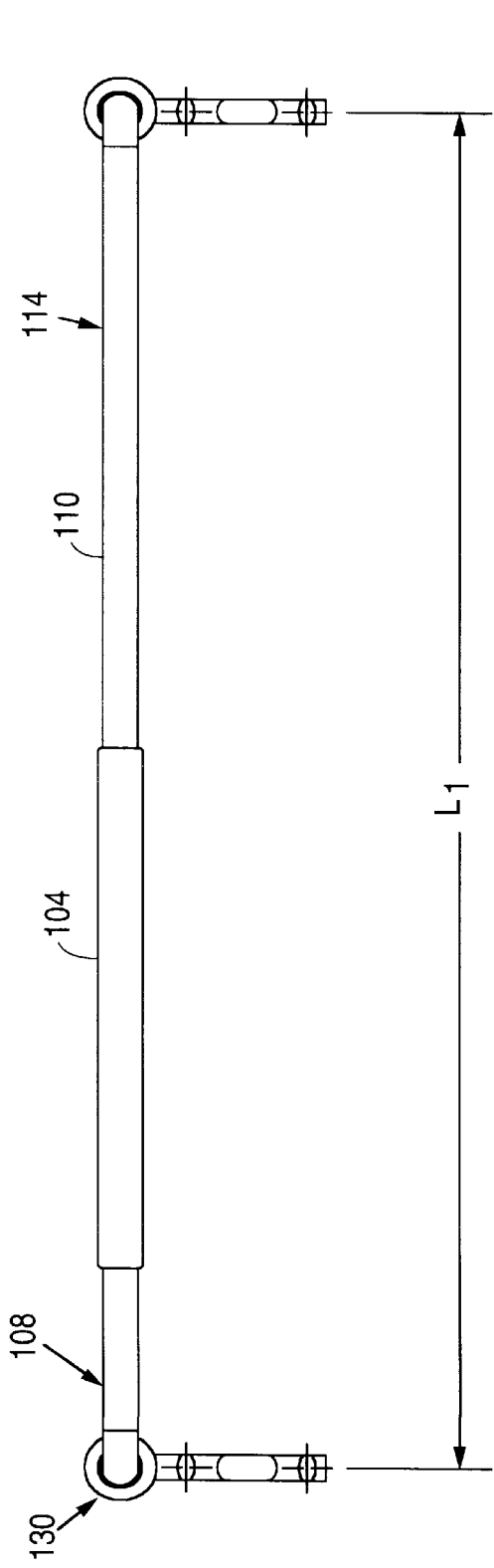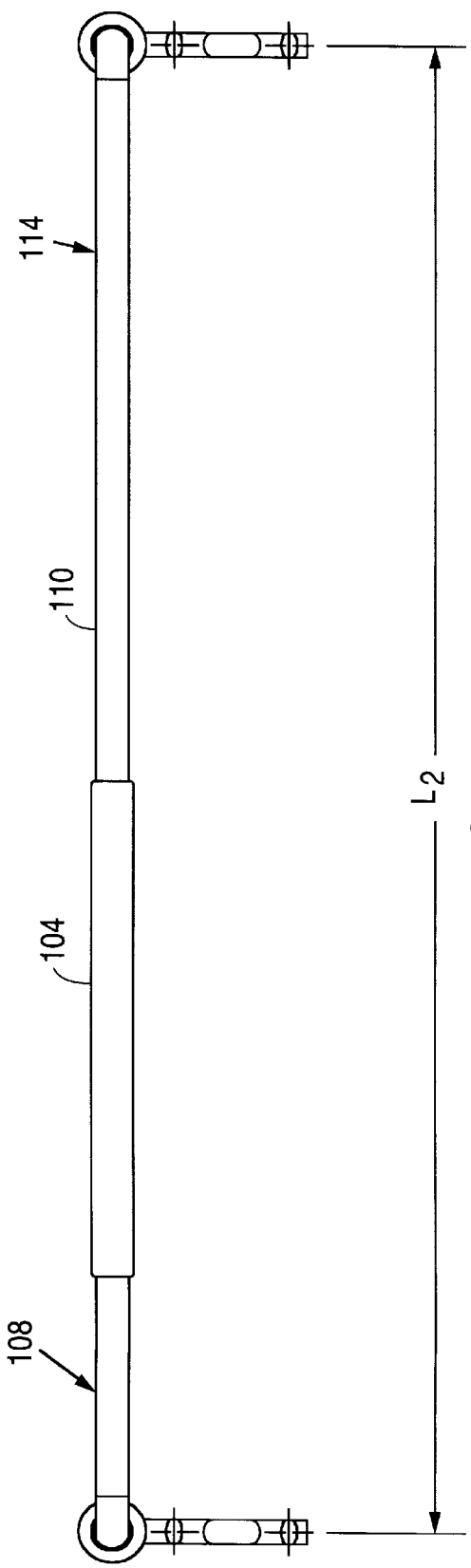

MECHANISM FOR SECURING CABLES

BACKGROUND OF THE INVENTION

Most modern equipment for implementing telecommunications systems contain an electronic apparatus housed in a casing. The casing is generally enclosed, with a front access door, sidewalls, and a backplane. Generally, the electronic apparatus located within the casing is electrically coupled to the backplane. In most instances, the backplane performs an interconnect function between the electronic apparatus within the casing and external cables, wires, and leads (hereinafter "cables") located outside the casing.

In most instances, the mass of cables which may emanate from the backplane, are allowed to freely dangle from the backplane. In this configuration, the cables may become easily dislodged, which may cause a disruption in the service being provided by the equipment. The mass of cables may also become entangled with other equipment systems, which may pose a hazard to technicians and others who work in close proximity to the equipment system. Finally, because the cables freely dangle form the backplane, undue strain may be placed on the cables, which may cause them to become dislodged or else may cause them to break.

SUMMARY OF THE INVENTION

In accordance with the present invention, a mechanism secures the cables which may emanate from a piece of equipment, such as telecommunications equipment. The present invention reduces the possibility of cables becoming dislodged, entangled, and/or broken, which can cause service disruption or other undesired hazards. The mechanism of the present invention, includes a bar assembly, which has a hollow member in telescopic engagement with an insertable member. Preferably, the insertable member can slide in and out of the hollow member, such that the length of the bar can be varied from a first dimension to a second dimension. The bar assembly of the present invention, also includes telescopically engaged end members, one positioned at each end of the mechanism. Beneficially, the depth of the mechanism, measured from the back of the equipment, may be varied to accommodate differently sized equipment components.

The ability to vary the length and the depth of the mechanism is particularly advantageous since it allows the mechanism to be used universally with equipment having different widths, and having differently sized components. Advantageously, the cables may be tied, anchored, secured, or otherwise fastened to the mechanism, such that the cables cannot be inadvertently dislodged from the equipment system. Because the cables are secured to the mechanism, and therefore not allowed to freely dangle, the potential for straining, tangling, or breaking the cables is reduced, which substantially reduces the possibility of danger to technicians and others.

These and other features and advantages of the present invention will be more readily apparent from the detailed description set forth below taken in conjunction with the accompanying drawings.

BRIEF DESCRIPTION OF THE DRAWINGS

FIG. 1 is a simplified illustration of a perspective view of the mechanism of the present invention;

FIGS. 2A and 2B are simplified illustrations of a front view of an embodiment of the mechanism of FIG. 1;

FIGS. 3A and 3B are simplified illustrations of a side view of an embodiment of the mechanism of FIG. 1;

DETAILED DESCRIPTION

Figure 4A:
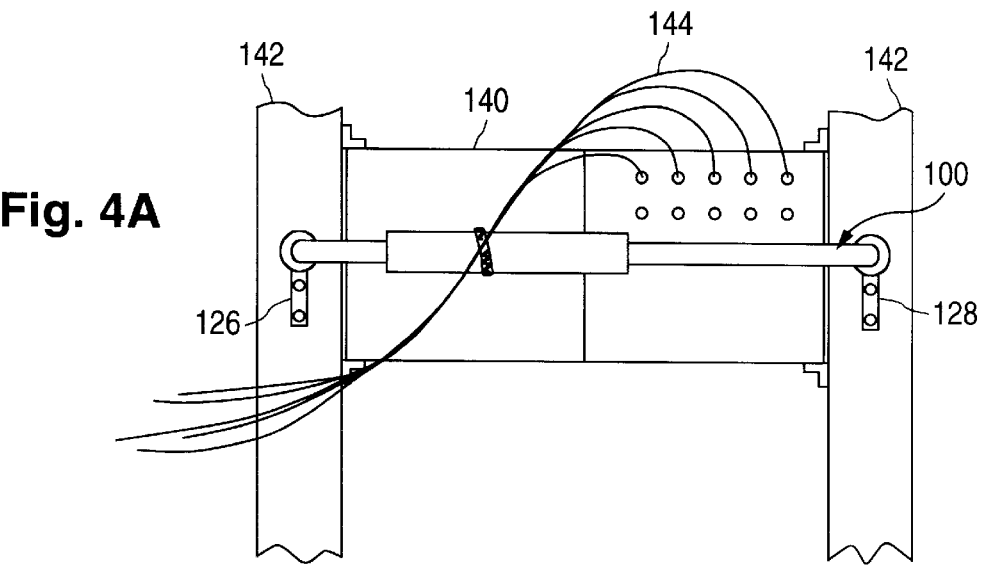
FIGS. 4A–4C are simplified illustrations of one embodiment of the mechanism of FIG. 1.

FIG. 1 is a simplified illustration of a perspective view of the mechanism of the present invention. Mechanism 100 includes a bar assembly 102. Bar assembly 102 includes a hollow member 104, having a first end 106, which is open, and a second end 108. Bar assembly 102 also includes an insertable member 110, which also has a first end 112 and a second end 114. In a preferred embodiment, first end 112 of insertable member 110 is telescopically engaged with open first end 106 of hollow member 104. In this configuration, at least a portion of insertable member 110 is slideable within hollow member 104. The inner and outer diameters of hollow member 104 and insertable member 110 may be any suitable dimension. In one embodiment, the outer diameter of hollow member 104 may range from about 0.4 in. to about 0.7 in., preferably about 0.5 in. The inner diameter of hollow member 104 may range from about 0.2 in. to about 0.6, preferably about 0.384 in. The diameter of insertable member 110 may range from between about 0.19 in. to about 0.58 in., preferably about 0.375 in. Regardless of the diameters used for hollow member 104 and insertable member 110, the tolerance between an inner diameter of hollow member 104 and an outer diameter of insertable member 110 should allow insertable member 110 to smoothly slide in hollow member 104, and, at the same time, prevent insertable member 110 from wobbling within hollow member 104. In one embodiment, the tolerance between an inner diameter of hollow member 104 and an outer diameter of insertable member 110 is about +/−0.014 in., preferably about +/−0.010 in.

As shown in FIG. 1, mechanism 100 also includes telescoping first and second telescoping end members 116 and 118. In one embodiment, first telescoping end member 116 is positioned proximate to second end 108 of hollow member 104. Similarly, second telescoping end member 118 is positioned approximate to second end 114 of insertable member 110. First and second telescoping end members 116 and 118 may be welded or similarly fastened on to ends 108 and 114 of bar assembly 102.

FIGS. 3A and 3B are simplified illustrations of an embodiment of first and second telescoping end members 116 and 118, with the description of the telescoping end members being made with reference to second telescoping end member 118. Second telescoping end member 118, includes a hollow end 122 and an insertable end 124. In one embodiment, insertable end 124 telescopically engages with hollow end 122. In this configuration, at least a portion of insertable end 124 is slideable within hollow end 122. The inner and outer diameters of hollow end 122 and insertable end 124 may be any suitable dimension. In one embodiment, the outer diameter of hollow end 122 may range from about 0.4 in. to about 0.7 in., preferably about 0.5 in. The inner diameter of hollow end 122 may range from about 0.2 in. to about 0.6, preferably about 0.384 in. The diameter of insertable end 124 may range from between about 0.19 in. to about 0.58 in., preferably about 0.375 in. Regardless of the diameters used for hollow end 122 and insertable end 124, the tolerance between an inner diameter of hollow end 122 and a diameter of insertable end 124 should allow for smooth relative movement between the ends 122 and 124, but should prevent wobble. In one embodiment, the tolerance between the inner diameter of hollow end 122 and the outer diameter of insertable end 124 may be about +/−0.14 in., preferably +/−0.010 in.

The strength of mechanism 100 should be great enough to support the weight of numerous cables. To ensure that mechanism 100 does not fail during use, the strength of the mechanism should be great enough to keep from breaking when, for example, a technician leans on the mechanism or otherwise uses it as a handle. Any suitable high strength material may be used for mechanism 100, such as steel, aluminum, composites, high strength plastics and stainless steel. In one embodiment, the material is selected which provides enough strength, such that mechanism 100 is capable of supporting at least about 75 lbs. to about 250 lbs., preferably no less than about 200 lbs.

The length of mechanism 100 can be adjusted by sliding insertable member 110 within hollow member 104 between a first position and a second position. In an exemplary embodiment, illustrated in FIGS. 2A and 2B, in the first position the length of mechanism 100 may be $L_1$. When in the second position the length of mechanism 100 may be adjusted to $L_2$. Conversely, the length of mechanism 100, may be adjusted from $L_2$ to $L_1$. For example, the length of mechanism 100 may be adjusted from about 15 in. to about 30 in., preferably from about 19 in. to about 23 in. Mechanism 100 may be designed longer or shorter to accommodate any particular piece of equipment. In one embodiment, the length of hollow member 104 maybe between about 8 in. and 12 in., preferably about 8 in. The length of insertable member 110 may be between about 6 in. and about 10 in., preferably about 7 in.

Referring again to FIGS. 3A and 3B, the depth of mechanism 100 is adjusted by adjusting the lengths of telescoping end members 116 and 118 between a first position and a second position. In an exemplary embodiment, when in the first position, the length of telescoping end member 118 may be $D_1$. When in the second position the length of telescoping end member 118 may be adjusted to $D_2$. Conversely, the depth of mechanism 100, may be adjusted from $D_2$ to $D_1$. The depth of telescoping end member 116 is adjusted in the same manner as telescoping end member 118. Mechanism 100 may be designed to adjust to any desired depth to accommodate a particular piece of equipment. In one embodiment, the depth of mechanism 100 may e adjusted from about 1 in. to about 10 in., preferably from about 3.5 in. to about 5 in., and more preferably from about 3.5 in. to about 4.5 in.

In one embodiment, the length of mechanism 100 may be fixed at either $L_1$ or $L_2$ using brackets 126 and 128 (FIG. 1), in conjunction with a conventional wall mount screw type fastener. Brackets 126 and 128 may be fastened to secure mechanism 100 to a support frame of a piece of equipment. When brackets 126 and 128 are secured in place, the movement of insertable member 110 is impeded, and, thus, the length of mechanism 100 is fixed.

The depth $D_1$ or $D_2$ of mechanism 100 may also be fixed using set screw assemblies 130 (FIGS. 3A and 3B). Insertable end 124 may be held within hollow end 122 when set screw assembly 130 is set (i.e. the screw is tightened). accordingly, the movement of insertable end 124 is impeded and thus, the depth of mechanism 100 is fixed.

Figure 4B:
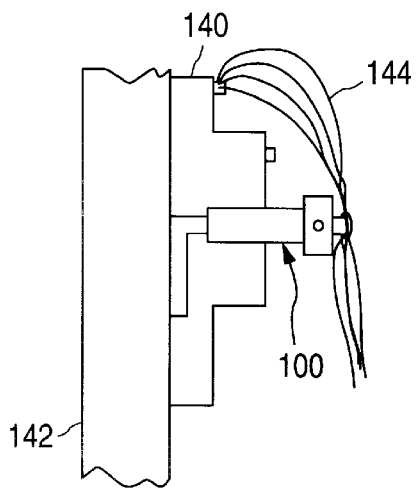
Figure 4C:
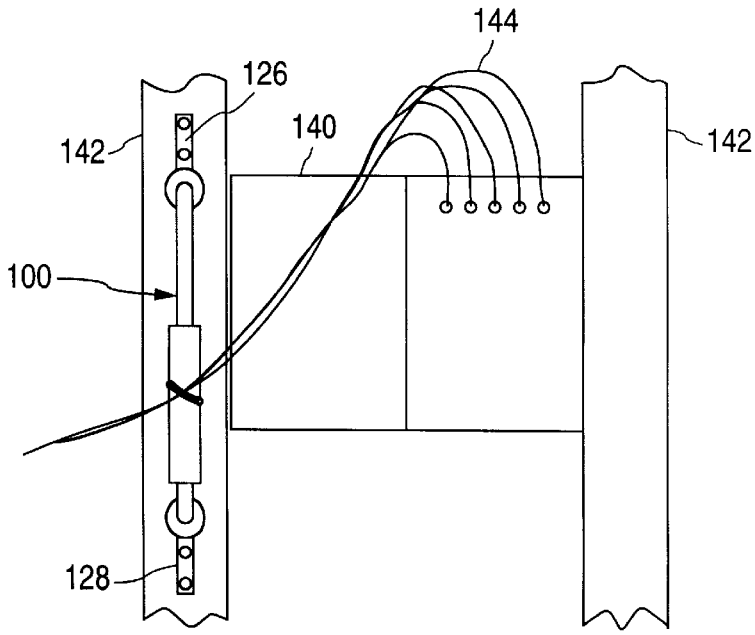

FIGS. 4A–4C are simplified illustrations of an embodiment of the present invention. In this embodiment, a telecommunications equipment system 140 is shown mounted on a support frame 142. System 140 has cables 144 which emanate from the rear of the system. Cables 144 are typically bunched together and secured on mechanism 100, by using tie wraps, tape, cinching collars, or lacing. In one embodiment, shown in FIG. 4A, mechanism 100 may be extended horizontally across the back of system 140 and attached by brackets 126 and 128 to frame 142. The depth of mechanism 100 is set to accommodate system 140 as shown in FIG. 4B. In an alternative embodiment, shown in FIG. 4C, mechanism 100 may be extended vertically along system 140. In this alternative embodiment, brackets 126 and 128 may be rotated up to 90° to facilitate the attachment of mechanism 100 to frame 142 in the vertical position.

Having thus described the preferred embodiments, persons skilled in the art will recognize that changes may be made in form and detail without departing from the spirit and scope of the invention. Thus the invention is limited only by the following claims.

What is claimed is:

1. A bar assembly used to secure cables, said bar assembly comprising:
   a hollow member having a first end and a second end, said first end being an open end;
   an insertable member in telescopic engagement with said hollow member, said insertable member being slideably moveable within said hollow member to adjust a length of the bar assembly from a first dimension to a second dimensions;
   means for securing at least one cable to the bar assembly; and
   a first telescoping end member formed on said hollow member, said first telescoping end member having a first size adjustable from a first length to a second length;
   a second telescoping end member formed on said insertable member, said second telescoping end member having a second size adjustable from said first length to said second length; and
   a pair of fastening devices positioned one on each of said first and second telescoping end members for fixedly coupling said first and second telescoping end members to a surface.

2. The bar assembly of claim 1, wherein said fastening devices comprise brackets.

3. The bar assembly of claim 1, wherein said first size and said second size are each adjustable from about 1 in. to about 5 in.

4. The bar assembly of claim 1, further comprising a pair of fasteners for fixing said first size and said second size to a fixed size.

5. The bar assembly of claim 1, wherein said bar assembly comprises a material taken from the group consisting of aluminum, plastic, reinforced composites, steel and stainless steel.

6. A cable securing mechanism comprising:
   a bar having a first end and a second end;
   means for securing at least one cable to the bar
   means for adjusting a length of said bar from between a first dimension and a second dimension;
   means for adjusting a depth of said bar from between a third dimension and a fourth dimension; and
   means for fixedly coupling said bar to a surface.

7. The mechanism of claim 6, wherein said means for adjusting said length of said bar from between said first dimension and said second dimension comprises:
   a hollow member; and
   an insertable member slideably moveable within said hollow member, wherein relative movement between said hollow member and said insertable member allows said bar to be adjusted from between said first dimension and said second dimension.

8. The mechanism of claim 6, wherein said means for adjusting said depth of said bar from between said third dimension and said fourth dimension comprises:

a first telescoping end member coupled to said first end of said bar being adjustable from between said third dimension and said fourth dimension; and a second telescoping end member coupled to said second end of said bar being adjustable from between said third dimension and said fourth dimension.

9. The mechanism of claim 6, wherein said length of said bar is adjustable from about 15 in. to about 30 in.

10. The mechanism of claim 6, wherein said depth of said bar is adjustable from about 1 in. to about 5 in.

11. The mechanism of claim 6, further comprising means for securing said adjustable depth to a fixed depth and means for securing said adjustable length to a fixed length.

12. The mechanism of claim 6, wherein said bar comprises a material taken from the group consisting of aluminum, steel, plastic, reinforced composites and stainless steel.

* * * * *